(12) United States Patent
Kim (10) Patent No.: US 7,931,395 B2
(45) Date of Patent: Apr. 26, 2011

(54) HEADLAMP ASSEMBLY FOR VEHICLES

(75) Inventor: Hak-Bong Kim, Gyeongbuk (KR)

(73) Assignee: SL Corporation, Daegu (KR)

( * ) Notice: Subject to any disclaimer, the term of this patent is extended or adjusted under 35 U.S.C. 154(b) by 145 days.

(21) Appl. No.: 12/369,050

(22) Filed: Feb. 11, 2009

(65) Prior Publication Data

US 2009/0207626 A1    Aug. 20, 2009

(30) Foreign Application Priority Data

Feb. 15, 2008 (KR) ......................... 10-2008-0014032

(51) Int. Cl.
*F21V 19/02* (2006.01)
(52) U.S. Cl. ........ 362/523; 362/294; 362/525; 362/528; 362/545
(58) Field of Classification Search .................. 362/294, 362/523–525, 528, 545
See application file for complete search history.

(56) References Cited

U.S. PATENT DOCUMENTS

| 7,427,151 B2 * | 9/2008 | Okubo et al. ................. 362/545 |
| 7,766,524 B2 * | 8/2010 | Naganawa et al. ........... 362/523 |

FOREIGN PATENT DOCUMENTS

| KR | 1020040087886 | 10/2004 |
| KR | 1020050076820 | 7/2005 |

* cited by examiner

*Primary Examiner* — Stephen F Husar
(74) *Attorney, Agent, or Firm* — Edwards Angell Palmer & Dodge LLP; Kongsik Kim, Esq.

(57) ABSTRACT

Provided is a headlamp assembly for vehicles. The headlamp assembly includes: a plurality of lamp modules on each of which a light-emitting device is mounted and each of which has a heat-dissipation structure for dissipating heat generated by the light-emitting device; and a support bracket which supports the lamp modules, wherein at least one of the lamp modules supported by the support bracket can be aimed individually with respect to the support bracket.

9 Claims, 9 Drawing Sheets

HEADLAMP ASSEMBLY FOR VEHICLES

This application claims priority from Korean Patent Application No. 10-2008-0014032 filed on Feb. 15, 2008, the disclosure of which is incorporated herein by reference in its entirety.

BACKGROUND OF THE INVENTION

1. Field of the Invention

The present invention relates to a headlamp assembly for vehicles, and more particularly, to a headlamp assembly for vehicles which uses a plurality of light-emitting diodes (LEDs).

2. Description of the Related Art

A vehicle usually includes a lighting system allowing a driver to see objects ahead better during night driving and informing other vehicles and road users of a driving state of the vehicle. A headlamp (also called a headlight) is a lamp illuminating the road ahead and requires a level of brightness that enables a driver to detect roadway obstacles 100 meters ahead at night.

Currently, a headlamp using semi-permanent light-emitting diodes (LEDs) as light sources is being manufactured. Since a single LED provides insufficient light distribution, a plurality of LEDs are used to manufacture the headlamp. The headlamp includes an aiming device to control light, which is emitted from the light sources, in all directions (up, down, right, and left).

Figure 1:
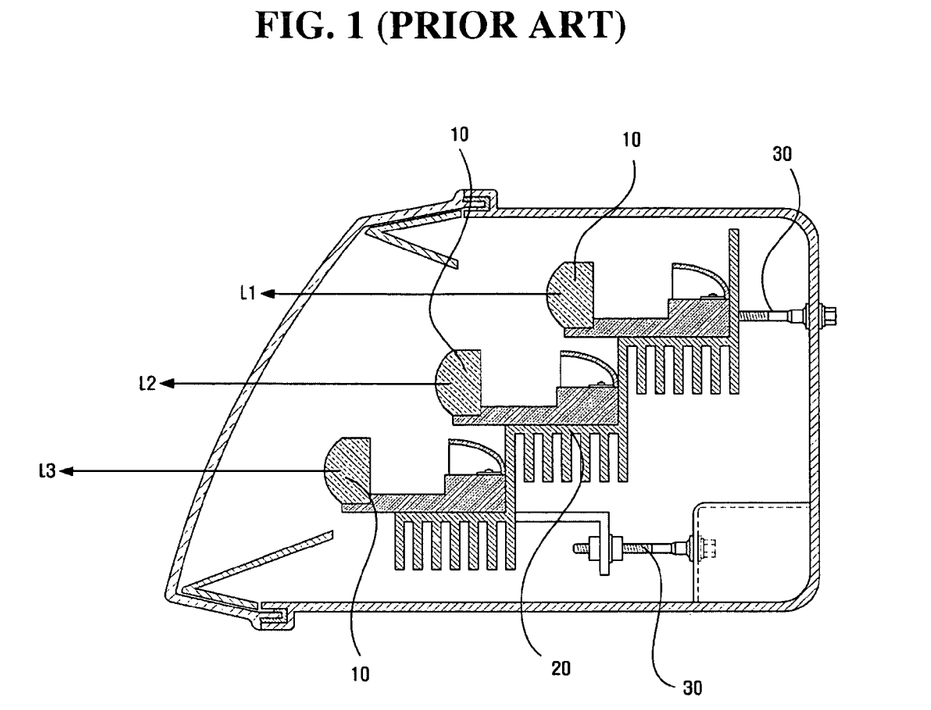
FIG. 1 is a side view of an aiming device of a conventional headlamp using light-emitting diodes (LEDs)
Figure 2:
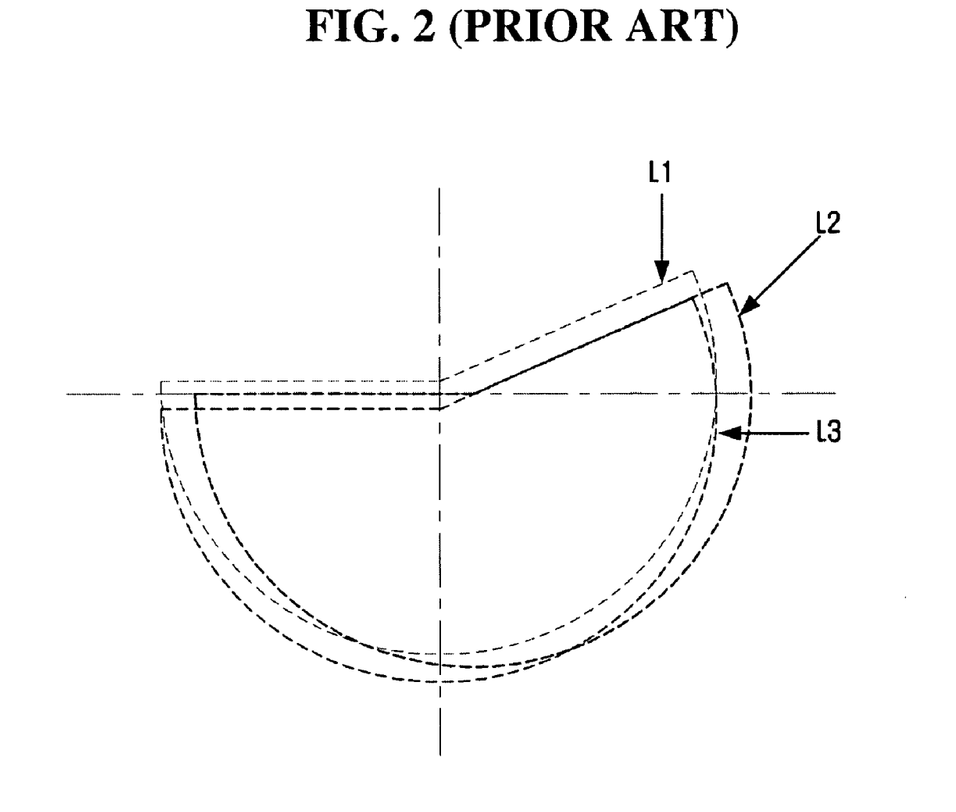
FIG. 2 illustrates light distribution patterns of light emitted from the headlamp shown in FIG. 1.

FIG. 1 is a side view of an aiming device of a conventional headlamp using LEDs. FIG. 2 illustrates distribution patterns of light emitted from the headlamp shown in FIG. 1.

Referring to FIG. 1, the headlamp includes a plurality of lamp units 10 mounted on a tiered support bracket 20. Although not shown in the side view, the lamp units 10 are arranged in a horizontal direction on each tier of the support bracket 20. In addition, a plurality of aiming screws 30 are connected to the support bracket 20, and thus the direction of light emitted from the lamp units 10 may be adjusted by controlling the aiming screws 30.

If the direction of the support bracket 20 is changed by controlling the aiming screws 30, all of the lamp units 10 mounted on the support bracket 20 move according to the movement of the support bracket 20. Therefore, it is possible to aim all of the lamp units 10 mounted on the support bracket 20 collectively but impossible to aim each of the lamp units 10 individually.

Referring to FIG. 2, when the lamp units 10 are initially mounted on the support bracket 20, their forward light distribution patterns do not match each other (distribution patterns of light emitted from L1 through L3 of FIG. 1 are shown in FIG. 2). However, the aiming device shown in FIG. 1 cannot match different distribution patterns of light that is emitted from the lamp units 10.

SUMMARY OF THE INVENTION

Aspects of the present invention provide a headlamp assembly for vehicles, in which a plurality of lamp units can be aimed individually to control distribution patterns of light emitted from the lamp units.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided a headlamp assembly for vehicles. The headlamp assembly includes: a plurality of lamp modules on each of which a light-emitting device is mounted; and a support bracket which supports the lamp modules, wherein at least one of the lamp modules supported by the support bracket can be aimed individually with respect to the support bracket.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Hereinafter, a headlamp assembly for vehicles according to embodiments of the present invention will be described in detail with reference to the attached drawings.

Figure 3:
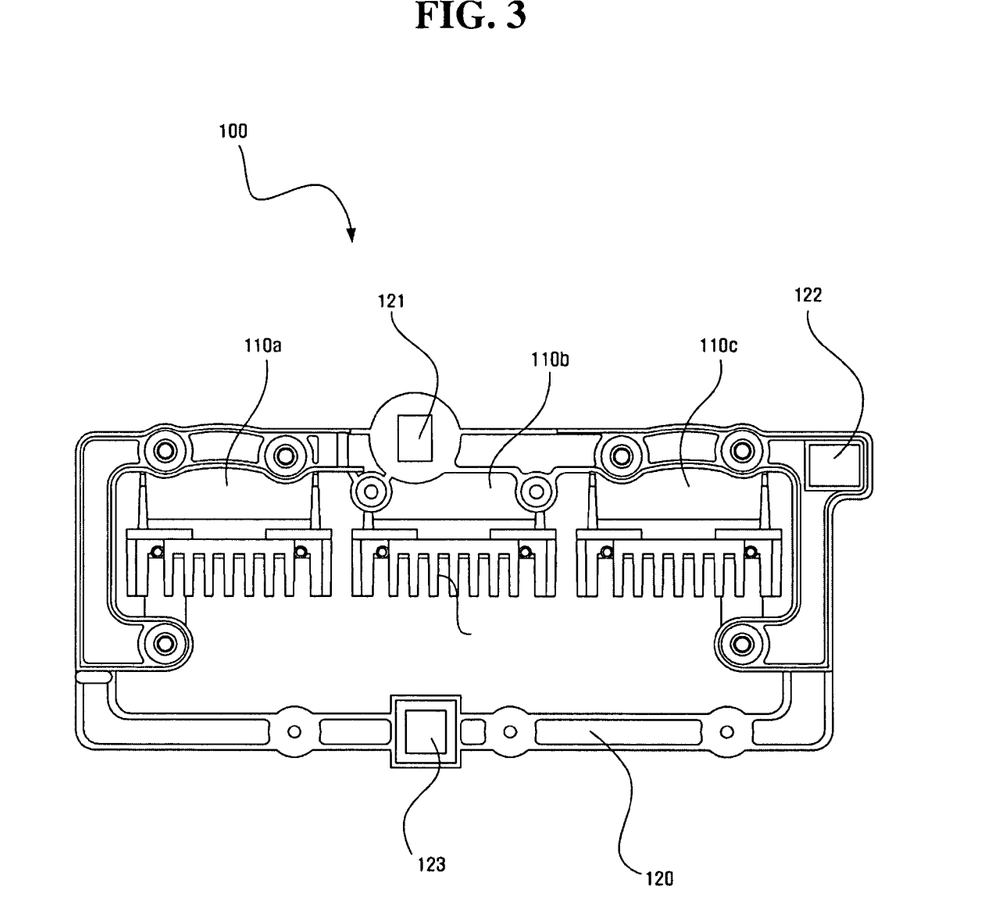
FIG. 3 is a front view of a headlamp assembly for vehicles according to an embodiment of the present invention.
Figure 4:
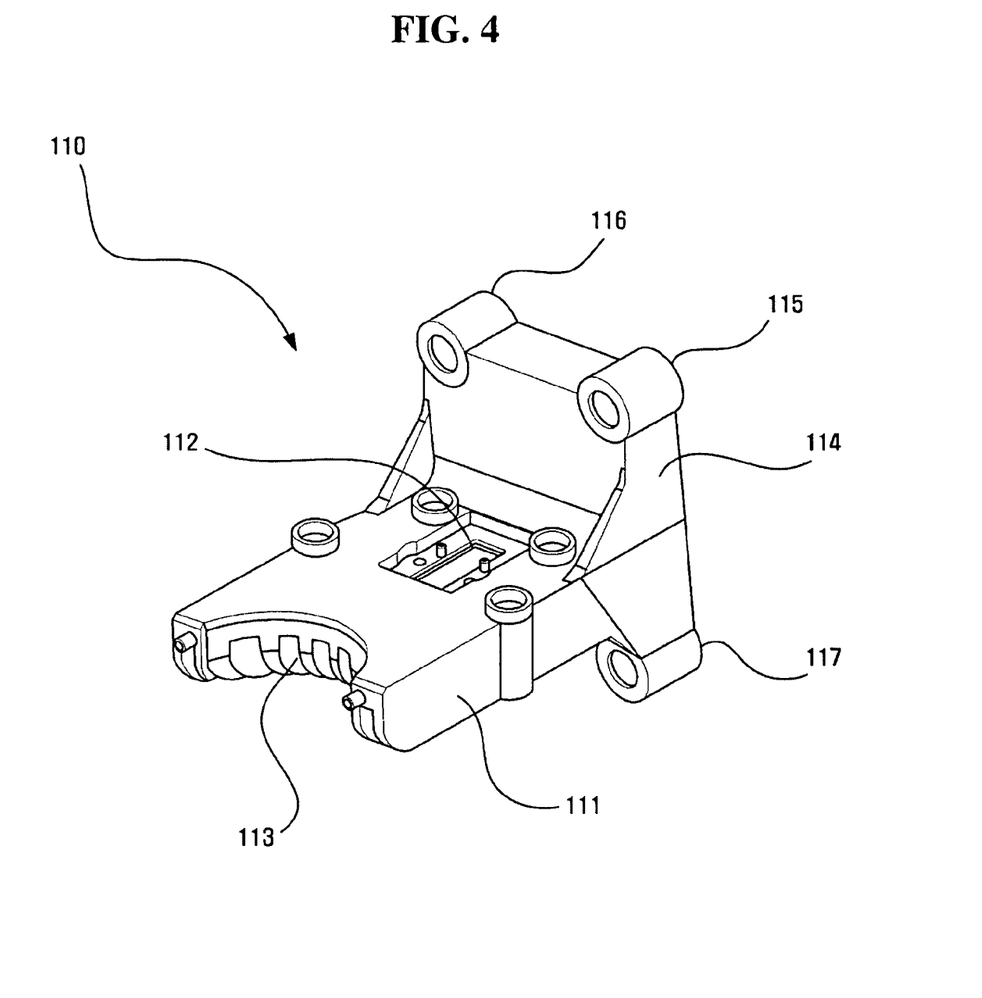
FIG. 4 is a perspective view of a lamp module according to an embodiment of the present invention.

FIG. 3 is a front view of a headlamp assembly 100 for vehicles according to an embodiment of the present invention. FIG. 4 is a perspective view of one of a plurality of lamp modules 110 according to an embodiment of the present invention.

The headlamp assembly 100 for vehicles according to the present invention may include the lamp modules 110 and a support bracket 120.

Referring to FIG. 4, each of the lamp modules 110 has an "L" shape. An installation groove 112 is provided in the center of a top surface of a horizontal portion 111 of the "L" shape, so that a s light-emitting device (not shown) can be mounted therein. Here, the light-emitting device may be a light-emitting diode (LED). A heat dissipation structure 113 is formed on a surface opposite to the top surface, on which the light-emitting device is installed, and dissipates heat generated by the light-emitting device. As shown in FIG. 3, the heat dissipation structure 113 may be composed of a plurality of raised and depressed portions in order to increase a surface area through which heat generated by the light-emitting device can be dissipated. Alternatively, the heat dissipation structure 113 may include a plurality of heat dissipation pins.

A sub-pivot connector 115, a first sub-aiming part 116, and a second sub-aiming part 117 are formed in the vertical portion 114 of the "L" shape. The sub-pivot connector 115, the first sub-aiming part 116, and the second sub-aiming part 117 are connected to the support bracket 120 and allow each lamp unit to be aimed individually about the support bracket 120. Here, each of the lamp modules 110 on which the light-emitting device is mounted will be referred to as a lamp unit. Each lamp unit can be aimed individually by using a sub-pivot support 215, a first sub-aiming screw 216, and a second sub-aiming screw 217 connected respectively to the sub-pivot connector 115, the first sub-aiming part 116, and the second sub-aiming part 117 of each of the lamp modules 110, which will be described in detail later with reference to FIGS. 5 through 10.

Each of the lamp modules 110 having the heat dissipation structure 113 may be made of a metal material, which contains a highly thermally conductive alloy, in order to transfer heat generated by the light-emitting device to the heat dissipation structure 113 and thus enhance heat dissipation efficiency.

Although not shown in the drawings, a length of the vertical portion 114 of the "L" shape of each of the lamp modules 110 may be adjusted so that each lamp unit mounted on the support bracket 120 has a different height.

The support bracket 120 supports the lamp modules 110. To be more accurate, the support bracket 120 supports a plurality of lamp units which include the lamp modules 120 and light-emitting devices (not shown) mounted on the lamp modules 120, respectively. The lamp units mounted on the support bracket 120 can be aimed collectively by using a pivot support 221, a first aiming screw 222, and a second aiming screw 223 connected respectively to a pivot connector 121, a first aiming part 122, and a second aiming part 123 of the support bracket 120, which will be described in detail later.

The support bracket 120 may be made of not only a metal material but also a non-metal material with a low thermal conductivity. For example, the support bracket 120 may be made of plastic.

Although not shown in the drawings, a portion of the support bracket 120 on which a particular lamp unit is mounted may protrude forward or backward. Thus, when the headlamp assembly 100 according to the present invention is seen from the side, each lamp unit may be mounted at a different location.

Hereinafter, an aiming device of the headlamp assembly 100 for vehicles according to the present embodiment will be described in detail with reference to FIGS. 5 through 9.

Figure 5:
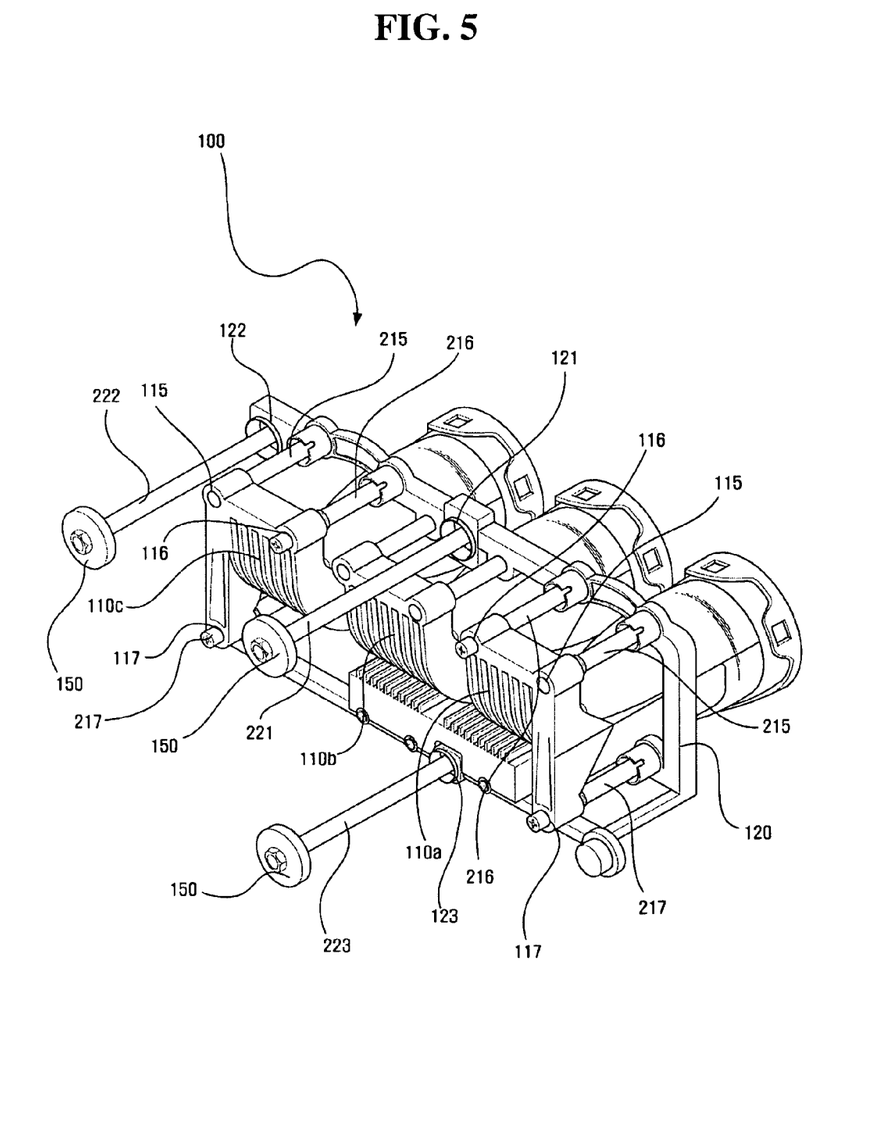
FIG. 5 is a perspective view for explaining an aiming device of the headlamp assembly for vehicles shown in FIG. 3.
Figure 6:
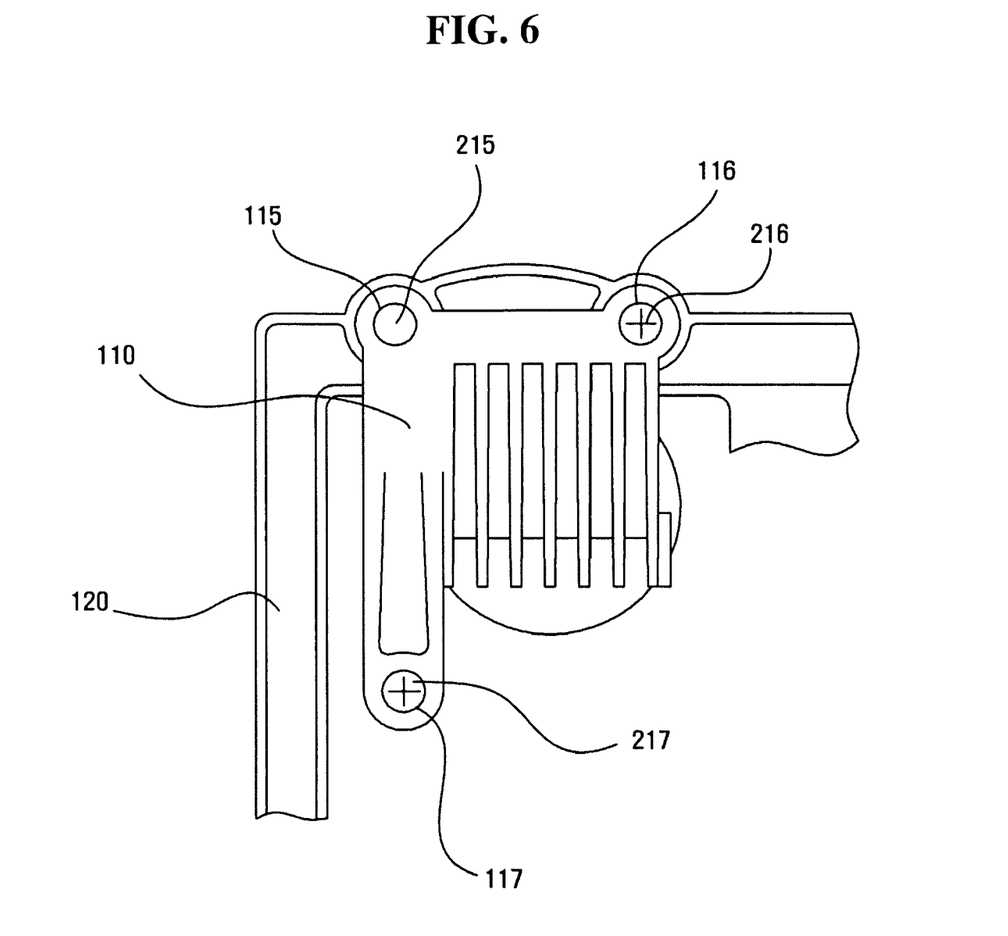
FIG. 6 is a view for explaining the individual aiming of a lamp module connected to a support bracket.
Figure 7:
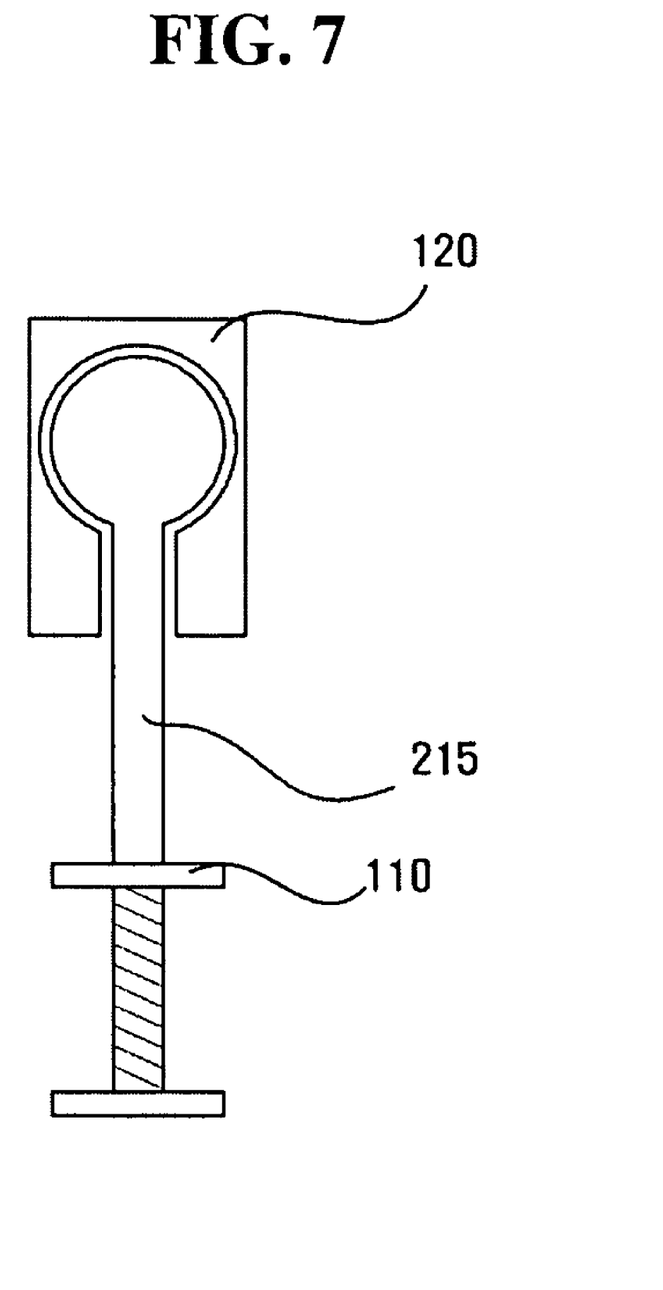
FIG. 7 shows a sub-pivot support coupled between a lamp module and the support bracket.
Figure 8:
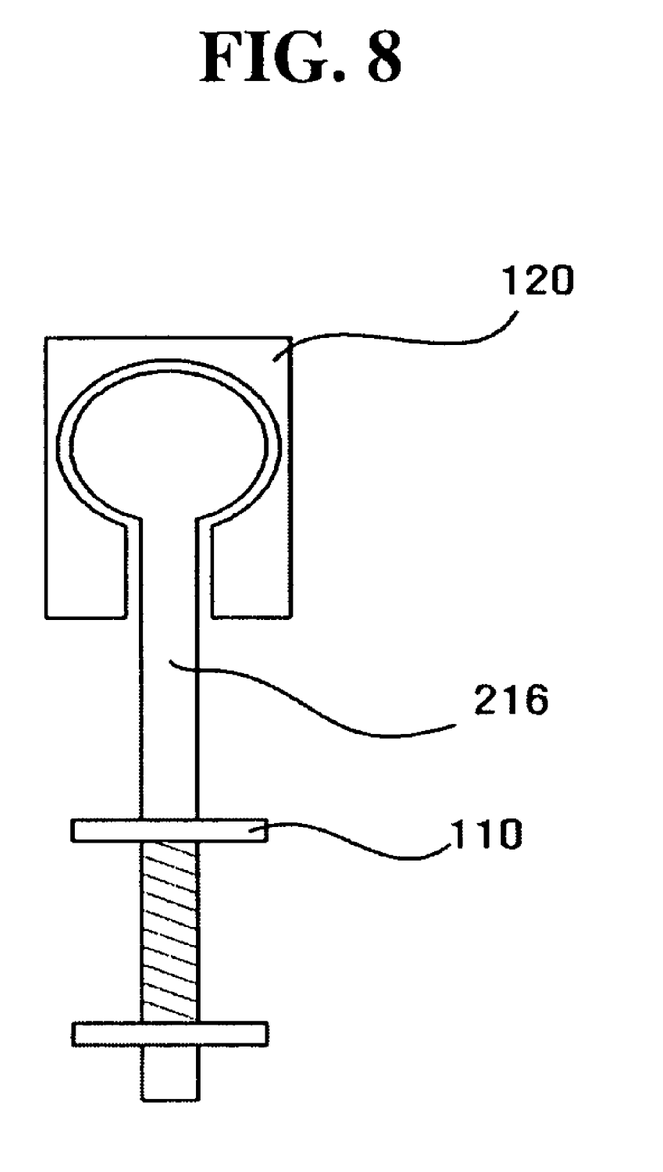
FIG. 8 shows a first sub-aiming screw coupled between a lamp module and the support bracket.
Figure 9:
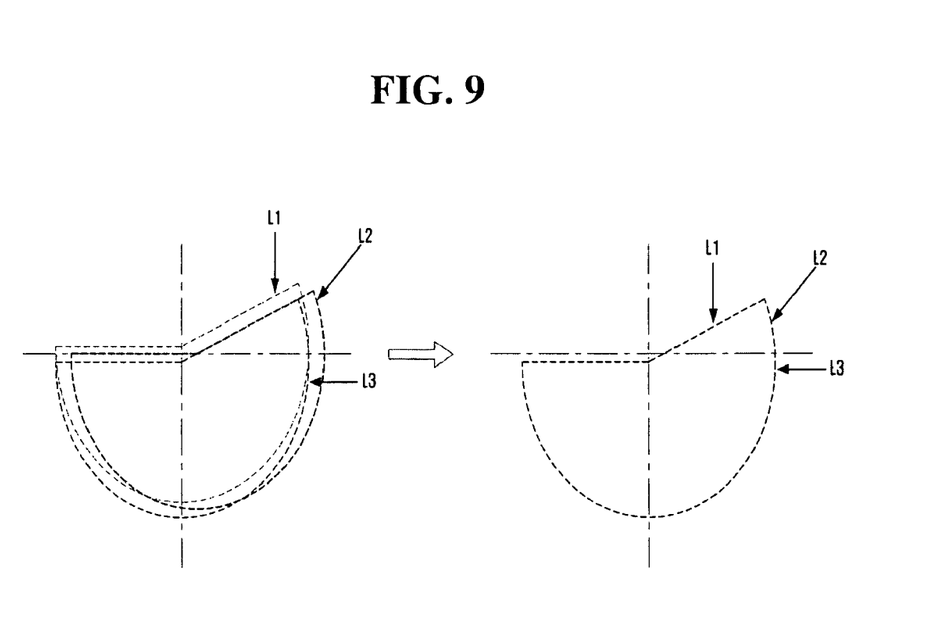
FIG. 9 illustrates light distribution patterns before and after lamp units are aimed individually by using the headlamp assembly shown in FIG. 3.

FIG. 5 is a perspective view for explaining the aiming device of the headlamp assembly 100 for vehicles shown in FIG. 3. FIG. 6 is a view for explaining the individual aiming of each of the lamp modules 110 connected to the support bracket 120. FIG. 7 shows the sub-pivot support 215 coupled between one of the lamp modules 110 and the support bracket 120. FIG. 8 shows the first sub-aiming screw 216 coupled between one of the lamp modules 110 and the support bracket 120. FIG. 9 illustrates light distribution patterns before and after lamp units 110a through 110c are aimed individually by using the headlamp assembly 100 shown in FIG. 3.

FIG. 5 is a perspective view of the headlamp assembly 100 shown in FIG. 3. Specifically, a perspective view of the rear of the headlamp assembly 100 opposite the direction in which light is emitted from each lamp unit is provided. In FIG. 5, the three lamp units 110a through 110c are mounted on the support bracket 120. However, the present invention is not limited thereto, and various numbers of lamp units can be mounted on the support bracket 120.

In the present invention, each of the lamp units 110a through 110c mounted on the support bracket 120 can be aimed individually, which will now be described first.

Referring to FIG. 5, the sub-pivot support 215, the first sub-aiming screw 216, and the second sub-aiming screw 217 may be coupled between each of the lamp units 110a through 110c and the support bracket 120.

Referring to FIG. 7, a portion of an end of the sub-pivot support 215, at which a screw thread is formed, is coupled to a screw thread of the sub-pivot connector 115 of each of the lamp modules 110. In addition, the other end of the sub-pivot support 215 may be pivotally coupled to the support bracket 120 by a ball and socket joint. Since the sub-pivot support 215 is pivotally coupled to the support bracket 120, when each of the lamp units 110a through 110c is moved by the first sub-aiming screw 216 or the second sub-aiming screw 217, its motion deviations in all directions (up, down, right and left) can be absorbed.

Referring to FIG. 8, a portion of the first sub-aiming screw 216, at which a screw thread is formed, is coupled to a screw thread of the first sub-aiming part 116. As described above, the other end of the first sub-aiming screw 216 may be pivotally coupled to the support bracket 120.

Like the first sub-aiming screw 216, the second sub-aiming screw 217 may be coupled between each of the lamp modules 110 and the support bracket 120. Since the coupling method of the second sub-aiming screw 217 is identical to that of the first sub-aiming screw 216 described above with reference to FIG. 8, a detailed description thereof will be omitted.

Referring to FIG. 6, the first sub-aiming part 116 of each of the lamp modules 110 is disposed in a horizontal direction from the sub-pivot connector 115. Here, the term "horizontal direction" denotes that the first sub-aiming part 116 is disposed to the right or left of the sub-pivot connector 115. In addition, the second sub-aiming part 117 is disposed in a vertical direction from the sub-pivot connector 115. Here, the term "vertical direction" denotes that the second sub-aiming part 117 is disposed above or under the sub-pivot connector 115.

In FIG. 6, a sub-pivot point formed by the sub-pivot connector 115 serves as a fixed point for aiming each of the lamp units 110a through 110c. Thus, each of the lamp units 110a through 110c can be aimed to the right or left of the sub-pivot point by rotating the first sub-aiming screw 216. In addition, each of the lamp units 110a through 110c can be aimed up or down with respect to the sub-pivot point by rotating the second sub-aiming screw 217. In this case, motion tolerance caused by the rotation of the first and second sub-aiming screws 216 and 217 can be absorbed by ball-and-socket pivot connection as shown in FIGS. 7 and 8.

A driver groove is formed at an end of each of the first and second sub-aiming screws 216 and 217 which is coupled to each of the lamp units 110a through 110c. Thus, each of the lamp units 110a through 110c can be aimed by manually rotating the first and second sub-aiming screws 216 and 217 using a screwdriver. One or more of the lamp units 110a through 110c mounted on the support bracket 120 may be fixed to the support bracket 120 such that it is impossible to aim the lamp units individually. That is, one or more lamp units fixed to the support bracket 120 may be aimed only by aiming the support bracket 120, and the other lamp units may be aimed individually such that their light distribution patterns match distribution patterns of light emitted from the lamp units which can be aimed by the support bracket 120 only. For example, the lamp unit 110b in the center of FIG. 5 is fixed to the support bracket 120 and thus cannot be aimed individually. On the other hand, the lamp units 110a and 110c on the right and left of the lamp unit 110b can be aimed individually so that their light distribution patterns match the light distribution pattern of the lamp unit 110b in the center.

A structure in which the lamp units 110 can be aimed collectively by the movement of the support bracket 120 will now be described in detail.

Referring to FIG. 5, the pivot support 221, the first aiming screw 222, and the second aiming screw 223 are coupled between the support bracket 120 and lamp housings 150.

An end of the pivot support 221 may be pivotally coupled to the pivot connector 121 of the support bracket 120 in the same way as shown in FIG. 6. As described above, since the pivot support 221 is pivotally coupled to the support bracket 120, when the support bracket 120 is moved by the first aiming screw 222 or the second aiming screw 223, its motion deviations in all directions (up, down, right and left) can be absorbed. Meanwhile, the other end of the pivot support 221 may be coupled to one of the lamp housings 150 on which the headlamp assembly 100 for vehicles according to the present invention is mounted. An end of the first aiming screw 222 may be pivotally coupled to the first aiming part 122 of the support bracket 120. In addition, the other end of the first aiming screw 222 is coupled to one of the lamp housings 150. Like the first aiming screw 222, the second aiming screw 223 is coupled between the support bracket 120 and the one of the lamp housings 150. Here, the coupling method of the second aiming screw 223 is identical to that of the first aiming screw 222.

The pivot support 221, the first aiming screw 222, and the second aiming screw 223 may be coupled between the support bracket 120 and the lamp housings 150 in the same way that the sub-pivot support 215, the first sub-aiming screw 216, and the second sub-aiming screw 217 are coupled between the lamp units 110a through 110c and the support bracket 120 as described above with reference to FIGS. 7 and 8.

As shown in FIG. 5, the first aiming part 122 of the support bracket 120 is disposed in a horizontal direction from the pivot connector 121. Here, the term "horizontal direction" denotes that the first aiming part 122 is disposed to the right or left of the pivot connector 121. In addition, the second aiming part 123 is disposed in a vertical direction from the pivot connector 121. Here, the term "vertical direction" denotes that the second aiming part 123 is disposed above or under the pivot connector 121.

In FIG. 5, a pivot point formed by the pivot connector 121 serves as a fixed point for aiming the support bracket 120. Thus, the support bracket 120 can be aimed to the right or left of the pivot point by rotating the first aiming screw 222. In addition, the support bracket 120 can be aimed up or down with respect to the pivot point by rotating the second aiming screw 223. In this case, motion tolerance caused by the rotation of the first and second aiming screws 222 and 223 can be absorbed by ball-and-socket pivot connection.

The lamp units 110a through 110c mounted on the support bracket 120 can be aimed collectively by aiming the support bracket 120 to the right or left, or up or down using the first or second aiming screw 222 or 223.

Here, a driver groove is formed at an end of each of the first and second aiming screws 222 and 223 which is coupled to each of the lamp housings 150. Thus, the support bracket 120 can be aimed by manually rotating the first and second aiming screws 222 and 223 using a screwdriver. Alternatively, the support bracket 120 may be automatically aimed by using a leveling device (not shown). The leveling device automatically rotates the first and second aiming screws 222 and 223 using, for example, a motor. In addition, the leveling device adjusts the height to which light is emitted from a headlamp by controlling an angle of rotation of the first or second aiming screw 222 or 223 in response to a signal received from a sensor installed in a vehicle.

FIG. 9 illustrates light distribution patterns before and after the lamp units 110a through 110c are aimed individually. In FIG. 9, L1 indicates a distribution pattern of light emitted from the lamp unit 110b in the center of FIG. 3, and L2 and L3 respectively indicate distribution patterns of light emitted from the lamp units 110a and 110c which are disposed on the left and right of the lamp unit 110b, respectively. As shown on the left of FIG. 9, when the lamp units 110a through 110c are initially mounted on the support bracket 120, they have different light distribution patterns. However, after the lamp units 110a and 110c on the left and right sides of the lamp unit 110b are aimed individually according to the present invention, their light distribution patterns match that of the lamp unit 110b in the center.

A headlamp assembly for vehicles according to the present invention provides at least one of the following advantages.

First, since a plurality of lamp units can be aimed individually, distribution patterns of light emitted from the lamp units can be adjusted.

Second, the lamp units cannot only be aimed individually but also collectively.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A headlamp assembly for vehicles, the headlamp assembly comprising:
    a plurality of lamp modules on each of which a light-emitting device is mounted; and
    a support bracket which supports the lamp modules,
    wherein the support bracket is made of a non-metal material with a low thermal conductivity and at least one of the lamp modules supported by the support bracket can be aimed individually with respect to the support bracket.

2. The headlamp assembly of claim 1, wherein the lamp modules are made of a metal material with a high thermal conductivity.

3. The headlamp assembly of claim 1, wherein the lamp modules supported by the support bracket are collectively aimed by the support bracket.

4. The headlamp assembly of claim 3, wherein at least one of the lamp modules supported by the support bracket is fixed to the support bracket and thus cannot be aimed individually.

5. The headlamp assembly of claim 3, wherein the support bracket comprises:
    the pivot connector which is pivotally coupled to an end of the pivot support; and
    a second aiming part which is disposed in a vertical direction from the pivot connector and pivotally coupled to an end of a second aiming screw, wherein the other end of each of the pivot support and the second aiming screw is coupled to the lamp housing, and the lamp modules supported by the support bracket are collectively aimed up or down by rotating the second aiming screw.

6. The headlamp assembly of claim 1, wherein each of the lamp modules comprises:
   a sub-pivot connector which is coupled to an end of a sub-pivot support; and
   a first sub-aiming part which is disposed in a horizontal direction from the sub-pivot connector and pivotally coupled to an end of a first sub-aiming screw,
   wherein the other end of each of the sub-pivot support and the first sub-aiming screw is pivotally coupled to the support bracket, and the each of lamp modules mounted on the support bracket are individually aimed to the right or left of the support bracket by rotating the first sub-aiming screw.

7. The headlamp assembly of claim 1, wherein each of the lamp modules has a heat dissipation structure which dissipates heat generated by the light-emitting device.

8. A headlamp assembly for vehicles, the headlamp assembly comprising:
   a plurality of lamp modules on each of which a light-emitting device is mounted; and
   a support bracket which supports the lamp modules,
   wherein at least one of the lamp modules supported by the support bracket can be aimed individually with respect to the support bracket, the lamp modules supported by the support bracket being collectively aimed by the support bracket, and
   wherein the support bracket comprises:
   a pivot connector which is pivotally coupled to an end of a pivot support; and
   a first aiming part which is disposed in a horizontal direction from the pivot connector and pivotally coupled to an end of a first aiming screw,
   wherein the other end of each of the pivot support and the first aiming screw is coupled to a lamp housing, and the lamp modules supported by the support bracket are collectively aimed to the right or left by rotating the first aiming screw.

9. A headlamp assembly for vehicles, the headlamp assembly comprising:
   a plurality of lamp modules on each of which a light-emitting device is mounted; and
   a support bracket which supports the lamp modules,
   wherein at least one of the lamp modules supported by the support bracket can be aimed individually with respect to the support bracket, and
   wherein each of the lamp modules comprises:
   a sub-pivot connector which is coupled to an end of the sub-pivot support; and
   a second sub-aiming part which is disposed in a vertical direction from the sub-pivot connector and pivotally coupled to an end of a second sub-aiming screw,
   wherein the other end of each of the sub-pivot support and the second sub-aiming screw is pivotally coupled to the support bracket, and the each of lamp modules mounted on the support bracket are individually aimed up or down with respect to the support bracket by rotating the second sub-aiming screw.

* * * * *